United States Patent [19]
Stepp

[11] Patent Number: 5,957,506
[45] Date of Patent: Sep. 28, 1999

[54] SHEET-METAL INSULATED REGISTER BOX WITH ADJUSTABLE ELBOW FITTING

[75] Inventor: Michael D. Stepp, Fort Worth, Tex.

[73] Assignee: M & M Manufacturing Co., Inc., Ft. Worth, Tex.

[21] Appl. No.: 09/031,633

[22] Filed: Feb. 27, 1998

[51] Int. Cl.$^6$ .................................................. F16L 43/00
[52] U.S. Cl. .......................... 285/183; 285/184; 285/222; 285/334.5; 285/382.1; 285/382.4; 285/424; 285/47; 29/509; 29/890.14
[58] Field of Search ................................. 285/183, 184, 285/272, 47, 424, 202, 203, 222, 275, 334.5, 278, 382.4, 197, 382.2, 382.1; 138/DIG. 4; 222/526; 413/22; 29/509, 890.14

[56] References Cited

U.S. PATENT DOCUMENTS

| | | | |
|---|---|---|---|
| 309,725 | 12/1884 | Milligan | 285/202 X |
| 568,574 | 9/1896 | Hoyer | 285/382.2 X |
| 2,464,506 | 3/1949 | Hirschfeld | 285/303 |
| 2,509,782 | 5/1950 | Person, Jr. | 285/211 |
| 3,290,066 | 12/1966 | Primich et al. | 285/183 |
| 3,866,950 | 2/1975 | Skoch et al. | 285/4 |
| 3,988,030 | 10/1976 | Twedell | 285/183 |
| 4,750,411 | 6/1988 | Eversol | 98/40 |
| 5,199,190 | 4/1993 | Mayer et al. | 285/183 X |
| 5,271,538 | 12/1993 | Lipker et al. | 222/526 X |
| 5,473,815 | 12/1995 | Sonden et al. | 29/890 |
| 5,603,533 | 2/1997 | Hayashi | 285/334 |

FOREIGN PATENT DOCUMENTS 1403744  8/1975  United Kingdom .................. 285/183

*Primary Examiner*—Dave W. Arola
*Attorney, Agent, or Firm*—Dennis T. Griggs

[57] ABSTRACT

A sheet-metal elbow is coupled by direct attachment to a flat sheet-metal air inlet panel of an air distribution boot or register box by roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly flared elbow coupling flange. The coupling flanges are clasped together by a hydraulic ram that drives an expandable mandrel into a V-shaped die cavity. The tightly clasped, overlapping flange portions permit smooth, continuous rotation of the elbow through 360° with respect to the register box for alignment with a branch conduit. The interlocked flanges also provide a strong mechanical union that is virtually leak-free under normal ventilation air flow conditions.

5 Claims, 4 Drawing Sheets

SHEET-METAL INSULATED REGISTER BOX WITH ADJUSTABLE ELBOW FITTING

BACKGROUND OF THE INVENTION

This invention relates generally to sheet-metal fittings of the type used in ventilation air distribution systems, and in particular to sheet metal elbows that connect round branch conduits to rectangular register boxes.

Conventional ventilation air distribution systems employ a number of rectangular ducts that may run forty feet or more from a plenum box that is coupled to an updraft furnace and blower fan assembly. The cross-sectional area of the main distribution duct is reduced by appropriate duct transition fittings, typically rectangular-to-rectangular and square-to-round to maintain constant air pressure and air flow conditions along the main distribution line.

Various take-off fittings including side coupling boots and wye and tee connectors allow branch conduits to be routed laterally away from and below the main distribution duct to reach remotely located ceiling register boxes. The branch conduits are typically made of galvanized sheet-metal, but sometimes are made of a flexible, wire-reinforced plastic sheet material. Sheet-metal elbows having 45° and 90° bends are available for connecting the branch conduits to the air inlet panel of a ceiling register box.

Conventional elbows have a crimped neck portion that fits within a female coupling collar attached to the flat air inlet panel of the register box. The female coupling collar is attached to the inlet panel by insertion of the circular inlet panel portion that borders the air inlet opening into a radial groove formed in the coupling collar. The cross-sectional air flow area of the elbow is matched to the size of the branch conduit to avoid an excessive pressure drop.

The elbow should be initially adjustable through 360° with respect to the register box to accommodate various branch conduit take-off run angles. The rotatable seal should have negligible air leakage at the interface union. Moreover, the inside flow surface through the elbow and across the elbow/register box union should be smooth and continuous, providing a substantially constant flow area cross-section and minimum flow resistance through the union. The union should be structurally stable for supporting the hanging load of the branch conduit, and also so that the elbow will not push into the register box or separate from the register box.

According to conventional construction practice, the main distribution ducts are suspended by straps from roof joists and the branch conduits are run over to pre-cut ceiling openings in which air distribution register boxes are to be mounted. Snap-on rails are usually provided for attaching the register boxes onto ceiling joists, with the register boxes being suspended from the joists and fitting into the pre-cut holes. The lower edge of the register box is inset slightly from the ceiling dry board panel for engaging an air outlet diffuser.

Conventional elbows are available with a pre-formed pipe bend, most commonly 45° and 90° bends. The inlet head orientation of the elbow must be adjusted to match the run-in angle of the branch conduit at the connection point. After the register box has been inserted into the pre-formed ceiling opening and attached to the joists, the crimped neck of the elbow is then inserted into the female coupling collar of the register box so that the elbow inlet head is properly aligned with the branch conduit. The branch conduit is then fitted onto the elbow inlet head and the neck of the elbow is mechanically attached to the sheet-metal female coupling collar on the register box, typically by sheet-metal screws or banding straps. The sheet-metal union is then sealed with a caulking compound and/or duct tape.

Most building codes require the elbow to be constructed of a rigid material, such as galvanized sheet-metal steel, in order to avoid a sharp transition in the air flow passage and to preserve the cylindrical profile and cross-sectional flow area of the branch conduit. Additionally, the coupling of the elbow to the register box must permit horizontal swiveling of the elbow so that its inlet head section can be properly aligned with the branch conduit.

It will be appreciated that the on-site attachment of the elbow onto the register box requires an additional entry into the attic by a sheet-metal craftsman to inspect the structural integrity of the sheet-metal union and to seal leaks at the union. The mechanical attachment of the elbow to the register box is made difficult when carried out on-site within an attic space because of uncomfortable working conditions, including for example insufficient lighting, excessive heat during the summer months and excessive cold during the winter months.

A register box having an air inlet opening of a predetermined air flow area is normally supplied with conditioned air delivered by a branch conduit having the same effective air flow area. Consequently, a particular elbow having either a 45° bend or a 90° bend and the same effective air flow area is required for use in that particular combination. In conventional installations where the elbow and register box are connected together on-site, the installation crew must maintain an inventory of appropriately sized elbows and register boxes which must be correctly matched for a particular branch connection. It will be appreciated that the installation of the register box and elbow could be expedited and parts inventory could be simplified by pre-assembling the elbow onto the register box and stocked as a matched set item.

A further limitation imposed by on-site attachment of the elbow onto the register box is that in some attic locations, the head room is severely limited with only minimum overhead clearance being provided to accommodate the vertical projection of the elbow. In such installations, the lack of adequate head room access around the elbow and the female register collar makes branch alignment, mechanical attachment, sealing, inspection and repair difficult and in some cases, impossible.

It will be appreciated that the difficulties and limitations discussed above could be avoided by using a pre-fabricated register box and rotatable elbow combination. Such a matched register box and elbow fitting, coupled together by a mechanically stable, reliable seal, could be set up in a pre-cut ceiling opening and connected to a branch conduit quickly and reliably, even in low head room installations.

Conventional elbow fittings, capable of rotation on a register box, fail to meet the requirements discussed above. For example, U.S. Pat. No. 3,290,066 to Primich et al discloses a sheet-metal elbow fitting that is coupled to a sheet-metal air duct panel. The lower end of the elbow fitting is provided with multiple, radially projecting tabs that project from a seating and sealing bead. The end of the elbow is inserted into a panel opening, and the tabs are bent upwardly against the inner sheet-metal sidewall of the air duct panel. The elbow appears to be rotatable within the duct opening, and the union is sealed by compression of the air duct sidewall panel between the sealing bead and the tabs.

The seal integrity and structural integrity of the tab coupling arrangement of Primich et al are compromised, since a tight sealing fit of the tabs sufficient to provide a good air seal would be too tight to allow free rotation of the elbow relative to the duct panel. On the other hand, if the tab engagement is made loose enough to permit free rotation of the elbow, the air seal would be interrupted by annular air gaps, and the coupling might not be strong enough to support a hanging load, and the elbow could easily separate from the duct panel.

Consequently, there is a continuing interest in providing a rotary metal-to-metal seal between a sheet-metal conduit, such as an elbow, and a flat sheet-metal panel, such as the air inlet panel of an air distribution register box, which permits swivel adjustment and provides a good air seal as well as being mechanical stable to support the hanging load of the branch conduit.

BRIEF SUMMARY OF THE INVENTION

According to one aspect of the present invention, a sheet-metal air duct elbow is coupled by direct attachment to a flat sheet-metal air inlet panel of an air distribution box or register boot by roll-formed flange portions that are mated in interlocking, overlapping engagement with each other. The overlapping flange portions allow smooth, continuous rotation of the elbow through 360° with respect to the air distribution box to accommodate all possible take-off run angles of the branch conduit. Because of the close interfitting surface-to-surface engagement between the overlapping flange portions, the rotatable seal has zero or negligible air leakage under normal air flow pressure conditions.

The overlapping flange portions project outwardly from the main bore of the elbow, and thus do not obstruct or reduce the flow area or cross-section through the union. Because the flange portions are tightly clasped together, their interlocking union provides structurally stable support for the hanging load imposed by the branch conduit. Likewise, the overlapping flange portions prevent the elbow from being pushed into the box, and strongly resist separation of the elbow from the register box panel.

Because the elbow and register box are pre-assembled, the combined elbow and register box can be installed reliably under minimum head room conditions, and the elbow can be rotated as desired to match any branch conduit run-in angle without interrupting the metal-to-metal seal. Consequently, the pre-assembled elbow and distribution box requires only a single inspection when initially installed. Caulking and banding are not required for air seal integrity, because of the excellent air seal provided by the overlapping, mutually clasped flange portions.

BRIEF DESCRIPTION OF THE DRAWING

The accompanying drawing is incorporated into and forms a part of the specification to illustrate the preferred embodiments of the present invention. Throughout the drawing, like reference numerals designate corresponding elements. This drawing, together with the description, serves to explain the principles of the invention and is only for the purpose of illustrating exemplary embodiments showing how the invention can best be made and used. The drawing should not be construed as limiting the invention to the illustrated and described embodiments. Various advantages and features of the invention will be understood from the following detailed description taken in connection with the appended claims and with reference to the attached drawing in which:

DETAILED DESCRIPTION OF THE INVENTION

Figure 1:
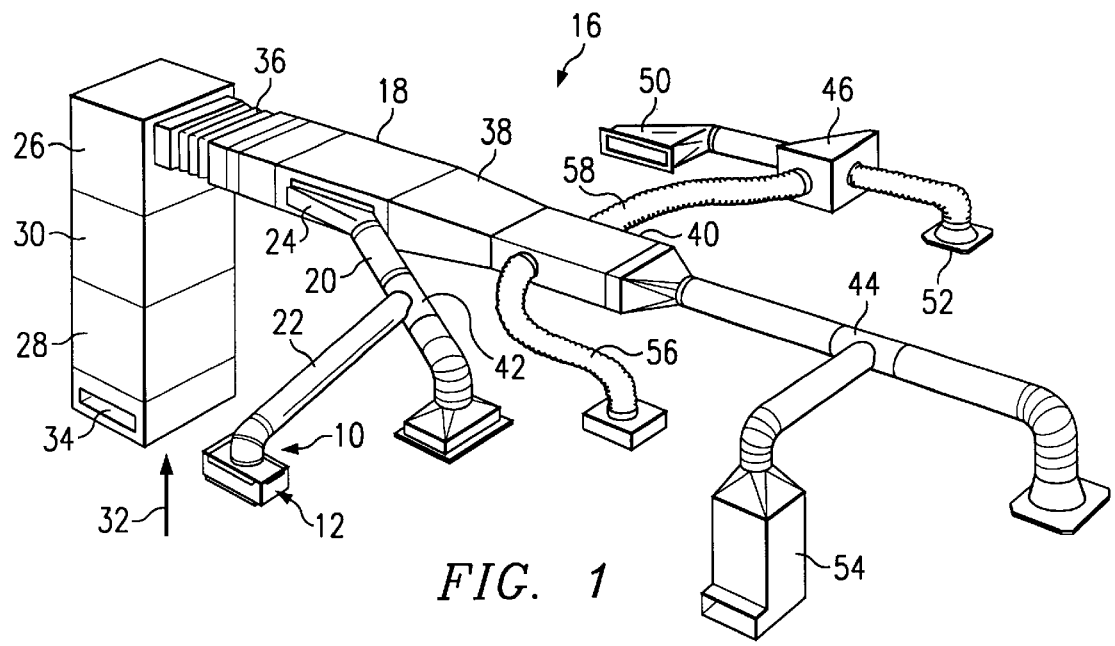
FIG. 1 is a perspective view of a typical air distribution system intended for attic installation.

A preferred embodiment of the present invention is described herein by referring to various examples showing how the invention can best be made and used. Like reference numerals are used throughout the description and several views of the drawing to indicate like or corresponding parts.

Figure 2:
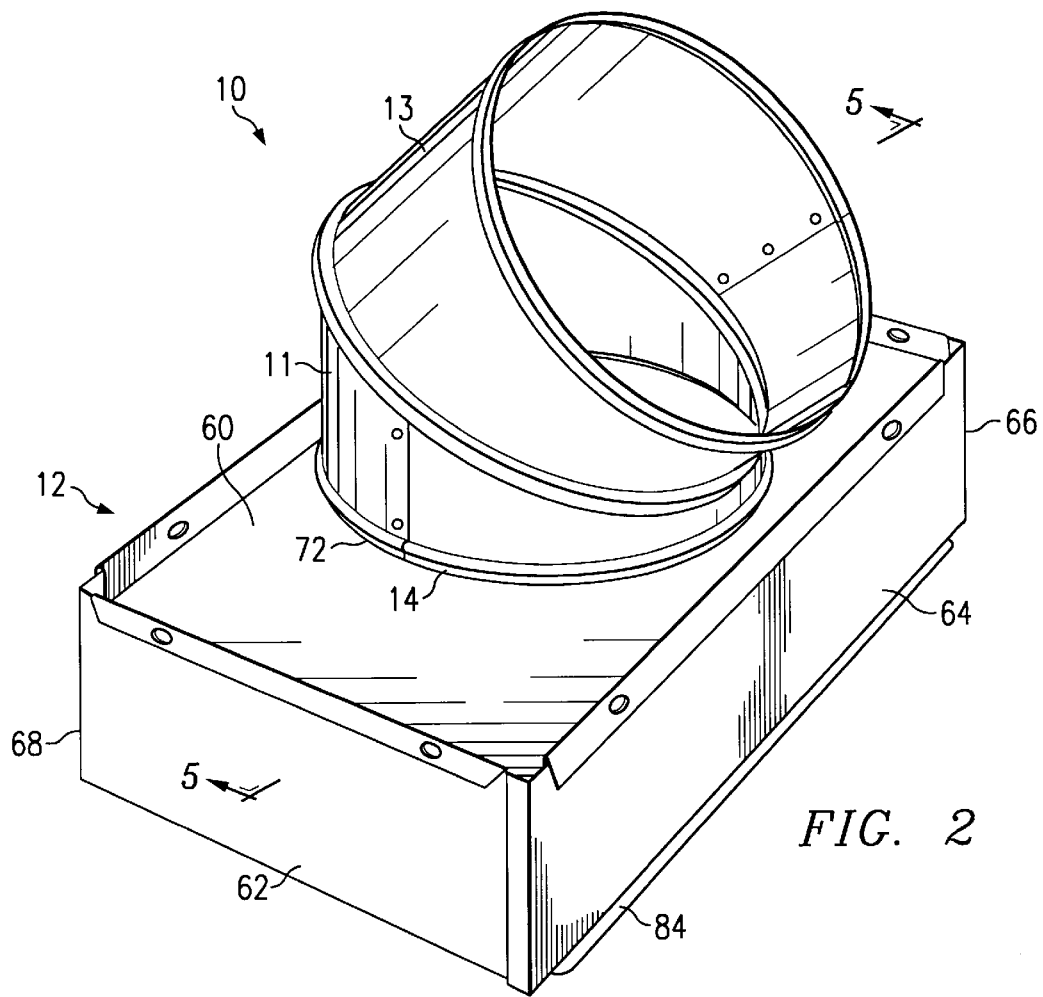
FIG. 2 is a perspective view of a pre-assembled elbow and insulated register box constructed according to the present invention.
Figure 3:
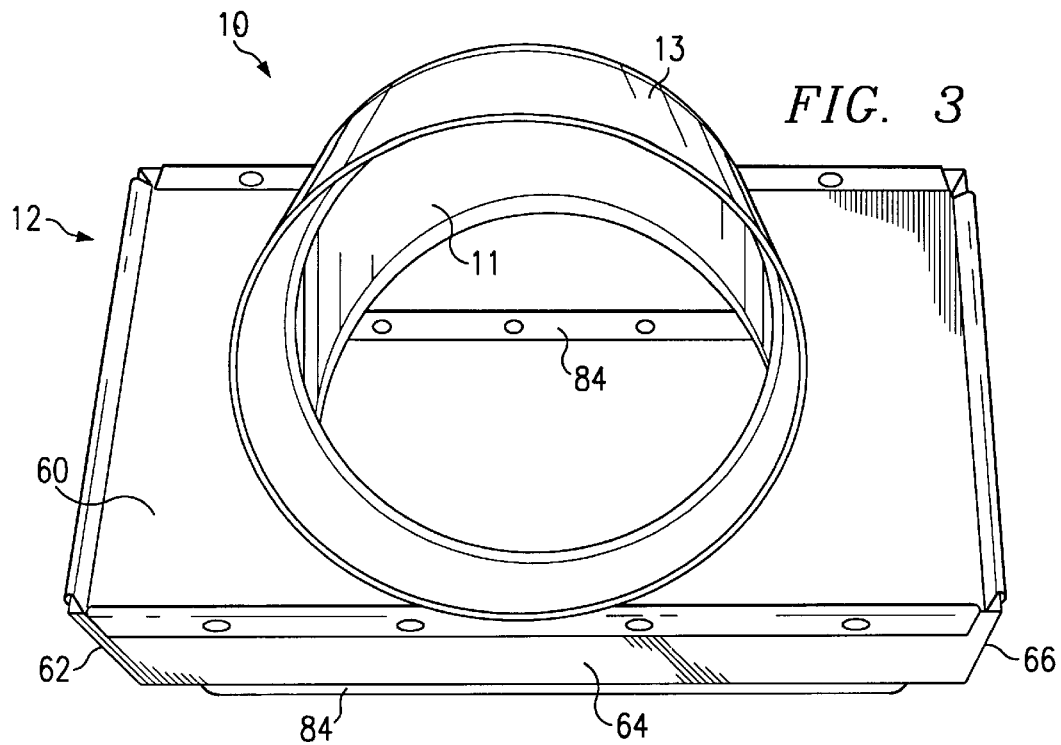
FIG. 3 is a top perspective view, looking down into the elbow and register box inlet opening.
Figure 4:
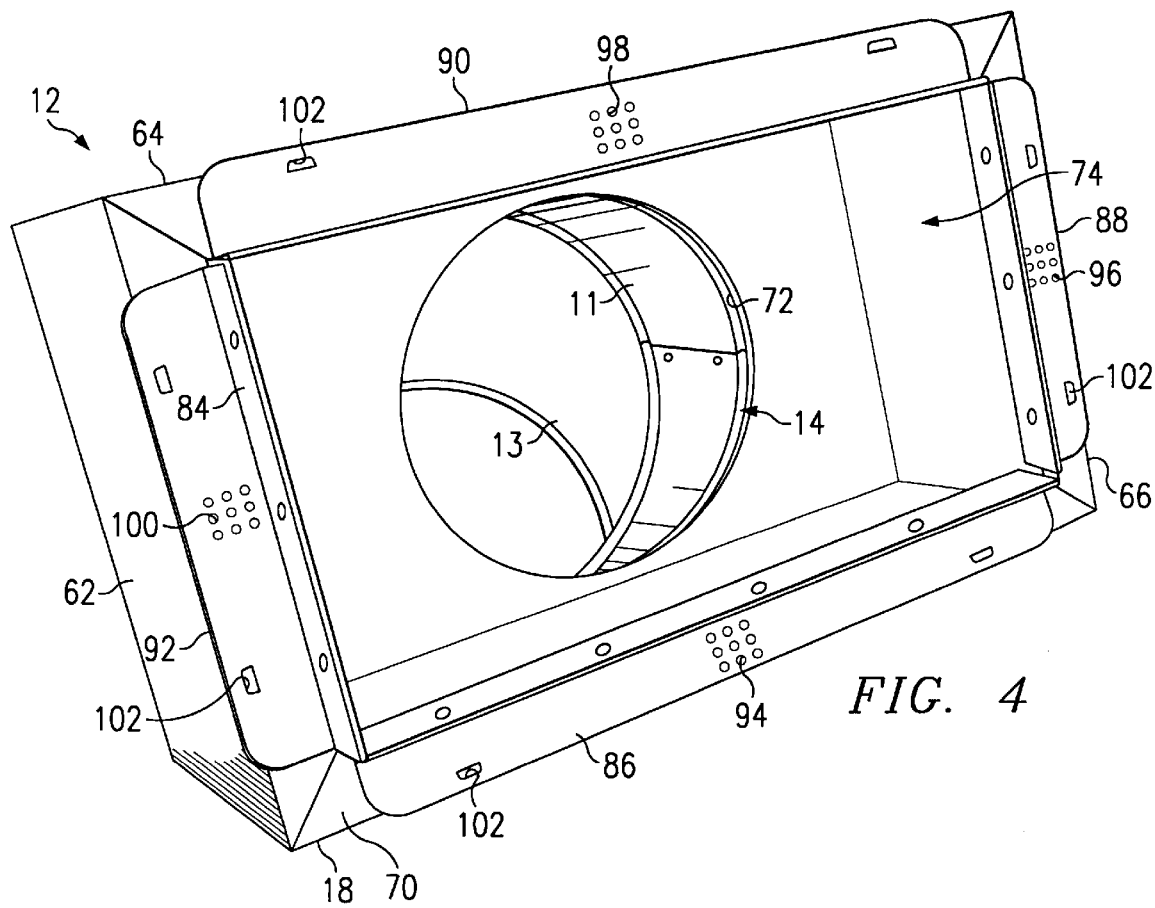
FIG. 4 is a bottom perspective view, looking into the air distribution outlet opening of the register box.

Referring now to FIG. 1 and FIG. 2, an elbow 10 is pre-assembled and connected onto an air distribution box 12, for example a ceiling register air distribution box, by a rotary, metal-to-metal flange coupling 14 constructed according to the present invention. The pre-assembled elbow/register box is intended for installation in a conventional ventilation air distribution system 16 of the type including a main distribution duct 18 and multiple branch conduits 20, 22 for delivering pressurized ventilation air into a conditioned room living space below the register box 12.

The main distribution duct 18 has a rectangular cross-section, and is coupled to the branch conduit 20 by a side take-off boot 24. The main rectangular duct 18 is coupled to an air flow plenum 26 that distributes conditioned air from an updraft furnace 28 and blower fan 30. Return air 32 is drawn into the furnace through a filter box assembly 34 according to conventional practice. The rectangular duct 18 is coupled to the plenum by a flexible connector duct 36.

In order to maintain constant pressure air flow, the cross-sectional area of the main distribution duct 18 is reduced by a duct transition fitting 38, which provides a transition between the rectangular outlet of the main flow duct 18 and the rectangular inlet of a main flow duct extension 40. Various take-off fittings, including the side coupling take-off boot 24, a wye connector 42, a tee connector 44 and a duct board triangle box 46, allow branch conduits to be routed laterally away from and below the main distribution duct to reach the remotely located register box 12 and other remotely located air distribution outlets such as a wall register box 50, a ceiling drop 52 and a stack head 54.

The branch conduits 22, 42 are typically made of 30-gauge galvanized sheet-metal steel, but may be made of a flexible, wire-reinforced plastic sheet material, for example the flexible branch conduits 56, 58. The elbow 10 is also made of galvanized 30-guage sheet-metal steel, and has a 45° bend for alignment with the slope of the branch conduit 22. Sheet metal elbows having a 90° bend as well as intermediate angular bends can also be used according to the branch conduit slope.

As is well understood in the construction trade, the run-in angles of the branch conduits and locations of the register boxes are determined by room location and placement of the ceiling cut-out openings. Because the exact run-in angle of a branch conduit is difficult to predict for any particular installation, the branch conduit must be run and "roughed in" to the ceiling cut-out and the elbow must be swiveled to bring its inlet head into alignment with the branch conduit before final attachment and sealing of the elbow to the register box can be completed. According to conventional construction practice, the main distribution ducts are suspended by sheet metal straps from roof joists and the branch conduit is supported as a hanging load from the main duct on the inlet end and from the elbow on the delivery end.

After the register box 12 has been inserted into the pre-formed ceiling opening and attached to the ceiling joist, the neck 11 of the elbow 10 is then rotated until the elbow inlet head 13 is properly aligned with the branch conduit 22. The branch conduit 22 is then fitted onto the elbow inlet head 13, typically with a band clamp or sheet metal screws. In the on-site connection of a conventional elbow fitting onto a female mounting collar, it is necessary for the craftsman to insert the crimped elbow neck onto the mounting collar and then mechanically fasten the overlapping parts by sheet metal screws or banding straps. The craftsman also seals the sheet-metal union with a caulking compound and/or duct tape.

When the elbow and register box are not pre-assembled, and the elbow is attached to the register box collar on-site only after the register box and branch conduits have been installed, it will be appreciated that a considerable amount of head room must be available around the register box to provide working access for carrying out the orientation and alignment of the elbow with the branch conduit, as well as for performing the mechanical attachment of the elbow to the female coupling collar.

This multiple-step installation procedure also requires an additional entry into the attic for follow-up inspection of the structural integrity of the elbow/register box collar union and to seal leaks at the union. In some installations, the register box is installed between the ceiling joists and directly below a low sloping portion of the roof which allows only minimum head room clearance for the vertical projection of the elbow.

Referring now to FIG. 2, FIG. 3, FIG. 4 and FIG. 5, the air distribution box 12 and is constructed of galvanized 30-gauge sheet-metal steel panels, including an inlet panel 60, side panels 62, 64, 66 and 68, and a base panel 70. The inlet panel 60 is intersected by a circular cut-out opening 72, typically 7⅛ inches I.D., which forms an inlet air opening for receiving pressurized air conducted through the branch conduit 22 and elbow 10. The base panel 70 is intersected by a rectangular cut-out opening 74 which is dimensioned for registration with a ceiling diffuser (not illustrated)

The side panels 62, 64, 66 and 68 are constructed from a single blank of galvanized sheet metal steel. The inlet panel 60 and the base panel 70 include flange portions that are folded over the side panels and are staked together to form a mechanically stable unit. The outlet box dimensions are 14 inches by 3 ½ inches by 8 inches for the exemplary embodiment shown in FIG. 2.

When assembled and connected together, the side panels, inlet panel 60 and base panel 70 provide sidewall boundaries for an air distribution chamber 76. Layers 78, 80 and 82 of thermal insulation are attached to the internal surfaces of the boundary panels to prevent heat transfer and for noise reduction purposes. The rectangular outlet opening 74 is framed by a depending rectangular lip 84 that is dimensioned for a snug sliding fit within the rectangular cut-out opening that is pre-cut in the ceiling.

Referring again to FIG. 4, connector flanges 86, 88, 90 and 92 project along the base panel 70 and are intersected by clusters of pre-drilled tap holes 94, 96, 98 and 100. The pre-drilled tap holes are conveniently located for assisting the starting of sheet-metal screw fasteners when a ceiling register or grill is attached to the underside of the air distribution box 12. Notch indentations 102 are formed in the flanges for snap-fit attachment to side rails that are nailed onto the ceiling joists.

Figure 5A:
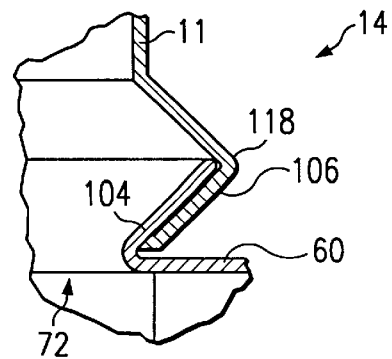
FIG. 5A is an enlarged sectional view of overlapping flanges of the elbow and inlet panel.
Figure 5:
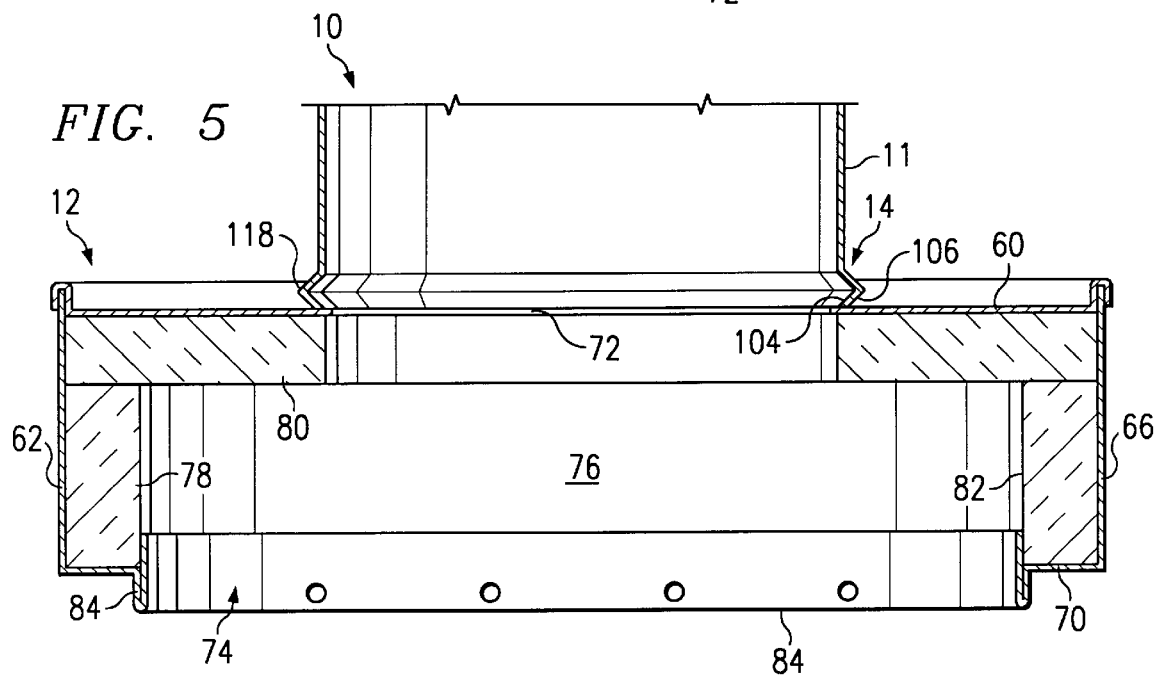
FIG. 5 is a sectional view thereof taken along the lines 5—5 of FIG. 2.
Figure 6:
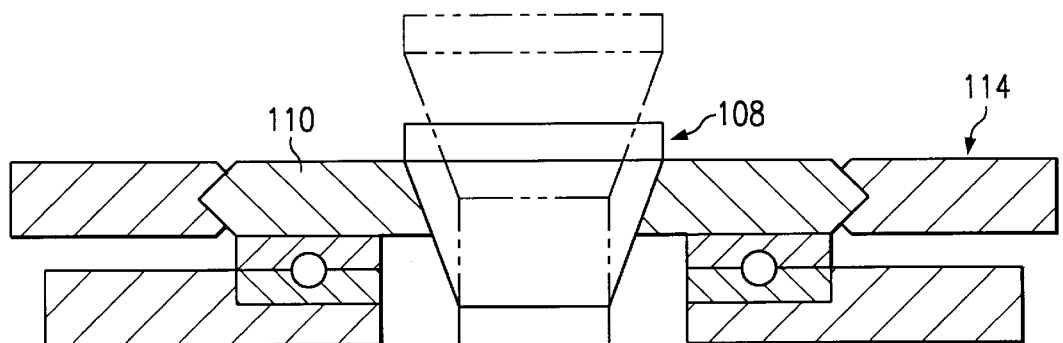
FIG. 6 is an elevation view, partly in section, of a hydraulic ram flange forming assembly.
Figure 7:
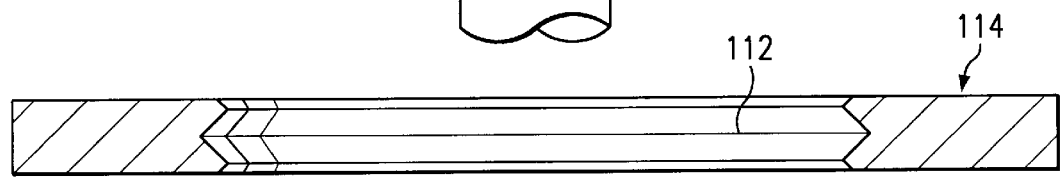
FIG. 7 is a sectional view of the flange forming die shown in FIG. 6.

Referring now to FIG. 2, FIG. 5 and FIG. 5A, the sheet-metal air duct coupling 14 utilizes roll-formed, overlapping annular flanges 104, 106 for direct attachment of the elbow 10 to the flat sheet-metal inlet panel 60 of the air distribution box 12. The overlapping flanges 104, 106 are formed by a hydraulic ram 108 (FIG. 6) that drives an expandable mandrel 110 into a V-shaped cavity 112 of a die 114. In response to ram pressure, the cylindrical end portion of the elbow neck 11 is pressed and cold-formed into the V-shaped die cavity 112.

Figure 8:
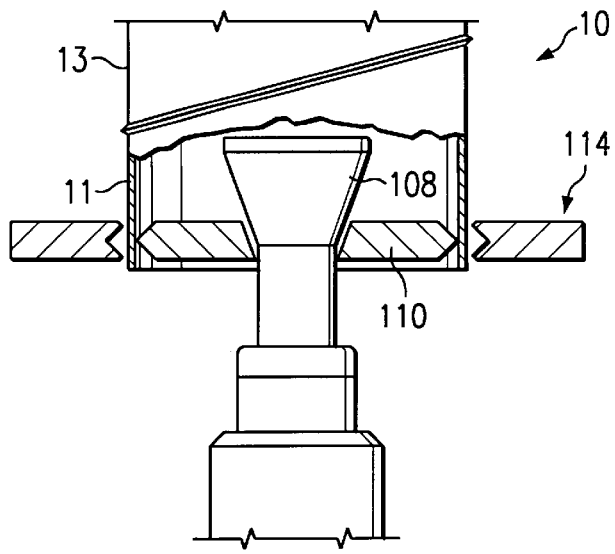
FIG. 8 is an elevation view, partly in section, showing the preliminary step of forming a folded flange in the neck of the elbow.
Figure 9:
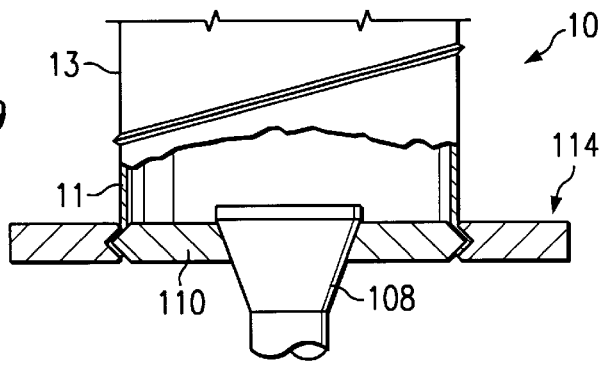
FIG. 9 is a view similar to FIG. 8 showing engagement of a rotary hydraulic ram against an expanding mandrel for roll-forming a folded flange on the neck of the elbow.
Figure 10:
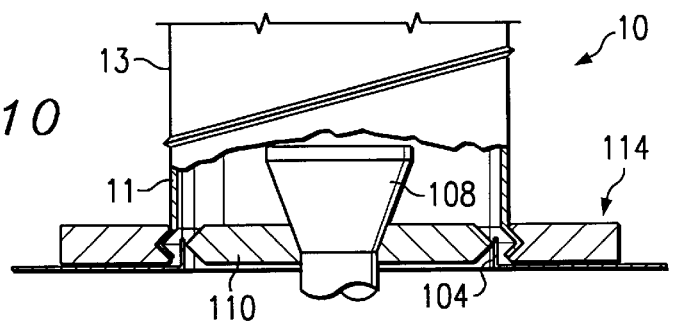
FIG. 10 is an elevation view, partly in section, of a pre-formed coupling collar of the register box inlet panel positioned within the bore of the folded flange for rolling engagement by the expanding mandrel; and, FIG. 11 is a side elevational view, partly in section, of the register box coupling collar being roll-formed in overlapping engagement with the folded flange of the elbow neck.
Figure 11:
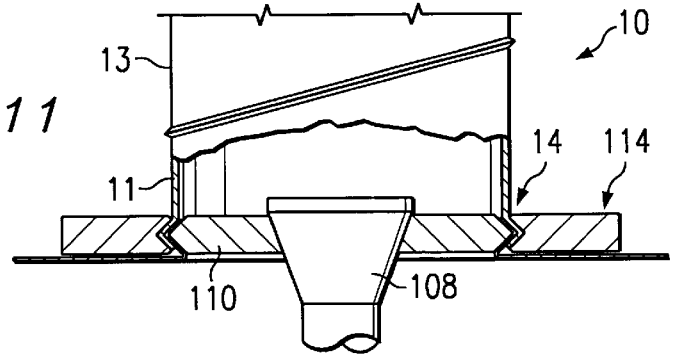

Referring to FIG. 8, the cylindrical neck 11 of the elbow is inserted into the annulus between the mandrel 110 and die cavity 112. As the ram 108 is engaged, the coupling collar on the elbow neck 11 is folded to form a radially offset, annular coupling flange 116 having a V-shaped rim profile 118 (FIG. 5A, FIG. 9). A pre-formed cylindrical flange portion 104 on the register box panel 60 is then inserted into the elbow neck 11 (FIG. 10) and is rolled and flared outwardly into overlapping engagement with the V-shaped coupling flange 106 (FIG. 11).

The overlapping flange portions 104, 106 permit smooth, continuous rotation of the elbow through 360° with respect to the register box to accommodate any take-off run angle. The tightly clasped, overlapping flange portions also provide a rotatable metal-to-metal seal 114 that has zero or negligible air leakage at normal ventilation air pressure conditions.

Referring again to FIG. 5A, the overlapping flange portions 104,106 are radially offset and project externally of the elbow neck 11, and thus do not obstruct or otherwise interfere with the continuous inside flow surface through the union. The tightly clasped, annular flanges also provide a strong, structurally stable mechanical connection for supporting the hanging load of the branch conduit 22. Moreover, because of the stability of the tightly clasped, interlocked flange union 14, the elbow 10 cannot be pushed into the register box, and strongly resists separation from the register box.

The distribution box 12 and elbow 10 are connected together off-site and thus can be installed as a matched set in locations that provide minimum overhead clearance for the elbow, requiring only a single inspection after run-in and set-up. Because of the smooth seal provided by the overlapping, tightly clasped folded flanges, neither caulking nor banding is required for air seal integrity.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

I claim:

1. In a ventilation air distribution system of the type including a main distribution duct and a branch conduit coupled to the main distribution duct for delivering pressurized ventilation air into an air distribution outlet box, the improvement comprising a sheet-metal elbow attached to a sheet-metal air inlet panel portion of the air distribution box, the elbow including a tubular sidewall coupled for rotational movement on the air inlet panel portion by overlapping flange members formed on the inlet panel portion and elbow sidewall, respectively, the overlapping flange members forming a generally V-shaped union which projects outwardly from the bore of the tubular sidewall, and the inlet panel flange member being disposed radially inwardly of the elbow sidewall flange member.

2. The ventilation air distribution system improvement as set forth in claim 1, the air inlet panel portion including an outwardly flared coupling flange bordering the air inlet opening; and, the elbow including a neck portion having a radially offset coupling flange disposed in clasped engagement with the outwardly flared coupling flange.

3. The ventilation air distribution system improvement as set forth in claim 1, the air inlet panel portion being intersected by an air inlet opening and including an outwardly flared coupling flange bordering the air inlet opening; and, the elbow including a neck portion coupled to the air inlet panel portion, the neck portion including a folded coupling flange, the folded coupling flange including a first annular flange portion flared outwardly from the elbow neck portion and a second annular flange portion connected to the first annular flange portion, the second annular flange portion generally defining a V-shaped rim with the first annular flange portion and being flared inwardly with respect to the V-shaped rim; and, the inlet panel coupling flange being encircled by the second annular flange portion, and said coupling flanges being disposed in mutually clasped engagement.

4. An air distribution box and elbow assembly comprising, in combination:

an air distribution box including sheet-metal panel members interconnected to form sidewall boundaries of an air distribution chamber, one panel member being intersected by an air inlet opening, the air inlet panel member including an outwardly flared coupling flange bordering the air inlet opening; and, a sheet-metal elbow having a tubular neck portion coupled to the air inlet panel, the neck portion including an inwardly turned annular coupling flange disposed in overlapping clasping engagement with the annular coupling flange of the air inlet panel.

5. An air distribution box and elbow assembly comprising, in combination:

an air distribution box including sheet-metal panel members interconnected to form sidewall boundaries of an air distribution chamber, one panel member being intersected by an air inlet opening, the air inlet panel member including an outwardly flared coupling flange bordering the air inlet opening; and, a sheet-metal elbow having a neck portion coupled to the outwardly flared coupling flange for rotational movement with respect to the air inlet panel, the neck portion including a radially offset, inwardly turned flange disposed in clasped engagement with the outwardly flared coupling flange, the outwardly flared coupling flange of the inlet panel member being disposed radially inwardly of the neck flange.

* * * * *